United States Patent
Hirano et al.

(10) Patent No.: US 10,462,850 B2
(45) Date of Patent: Oct. 29, 2019

(54) METHOD OF MANUFACTURING CERAMIC SINTERED BODY, CERAMIC SINTERED BODY, AND CERAMIC HEATER

(75) Inventors: Satoshi Hirano, Kanagawa (JP); Toshihiro Tachikawa, Kanagawa (JP); Junichi Miyahara, Kanagawa (JP); Toshihiko Hanamachi, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 725 days.

(21) Appl. No.: 13/879,882

(22) PCT Filed: Oct. 24, 2011

(86) PCT No.: PCT/JP2011/074458
§ 371 (c)(1),
(2), (4) Date: Apr. 17, 2013

(87) PCT Pub. No.: WO2012/057091
PCT Pub. Date: May 3, 2012

(65) Prior Publication Data
US 2013/0200067 A1    Aug. 8, 2013

(30) Foreign Application Priority Data
Oct. 29, 2010    (JP) ................. 2010-244498

(51) Int. Cl.
*H05B 3/26* (2006.01)
*C04B 35/645* (2006.01)
(Continued)

(52) U.S. Cl.
CPC .......... *H05B 3/265* (2013.01); *C04B 35/645* (2013.01); *C04B 37/025* (2013.01);
(Continued)

(58) Field of Classification Search
CPC ... C04B 35/645; C04B 37/025; C04B 37/026; C04B 2237/122; C04B 2237/343;
(Continued)

(56) References Cited

U.S. PATENT DOCUMENTS 4,943,468 A * 7/1990 Gordon et al. ............... 428/210
5,034,352 A * 7/1991 Vit et al. ........................ 501/1
(Continued)

FOREIGN PATENT DOCUMENTS

JP   61-179084 A   8/1986
JP   03-226986 A   10/1991
(Continued)

OTHER PUBLICATIONS

JP 2001-244321 A Machine Translation (Translated May 11, 2015).*
(Continued)

*Primary Examiner* — Shawntina T Fuqua
(74) *Attorney, Agent, or Firm* — Locke Lord LLP; James E. Armstrong, IV; Nicholas J. DiCeglie, Jr.

(57) ABSTRACT

A method of manufacturing a ceramic sintered body, includes: a film forming step of forming, on a surface of a heat-resistant metal material, a metal coating film made of a metal material having a standard free energy of formation of metal carbides lower than that of the heat-resistant metal material; a molding step of disposing the heat-resistant metal material provided with the coating film in the film forming step at a predetermined position in powder that serves as a starting material of a ceramic base, and molding a ceramic green body by press-molding the powder; and a sintering step of generating a ceramic sintered body by sintering the ceramic green body molded in the molding step.

9 Claims, 5 Drawing Sheets

(51) Int. Cl.
*C04B 37/02* (2006.01)
*H05B 3/28* (2006.01)
*H05B 3/74* (2006.01)
*H05B 3/18* (2006.01)

(52) U.S. Cl.
CPC .......... *C04B 37/026* (2013.01); *H05B 3/18* (2013.01); *H05B 3/283* (2013.01); *H05B 3/74* (2013.01); *C04B 2237/083* (2013.01); *C04B 2237/122* (2013.01); *C04B 2237/343* (2013.01); *C04B 2237/366* (2013.01); *C04B 2237/368* (2013.01); *C04B 2237/40* (2013.01); *C04B 2237/60* (2013.01); *C04B 2237/708* (2013.01); *C04B 2237/72* (2013.01); *C04B 2237/84* (2013.01); *H05B 2203/017* (2013.01)

(58) Field of Classification Search
CPC ........ C04B 2237/366; C04B 2237/368; C04B 2237/40; C04B 2237/60; C04B 2237/708; H05B 3/18; H05B 3/283; H05B 3/74
USPC ...... 219/444.1, 543, 546–548; 29/610.1, 615
See application file for complete search history.

(56) References Cited

U.S. PATENT DOCUMENTS

| | | | | |
|---|---|---|---|---|
| 5,615,078 | A * | 3/1997 | Hudis | H01G 4/38 361/301.5 |
| 5,851,599 | A * | 12/1998 | Harada et al. | 427/531 |
| 6,071,644 | A * | 6/2000 | Ikemachi | C01B 3/0057 29/623.5 |
| 6,555,031 | B2 * | 4/2003 | Gadkaree et al. | 264/29.7 |
| 7,126,090 | B2 * | 10/2006 | Yamaguchi | H01L 21/67103 118/724 |
| 8,304,701 | B2 * | 11/2012 | Akatsuka | H05B 3/143 118/427 |
| 8,381,587 | B2 * | 2/2013 | Kasama et al. | 73/335.04 |
| 2003/0045222 | A1 * | 3/2003 | Ohmori et al. | 451/546 |
| 2003/0183615 | A1 | 10/2003 | Yamaguchi et al. | |
| 2005/0186337 | A1 * | 8/2005 | Bringley | B01J 13/0008 427/220 |
| 2006/0118402 | A1 * | 6/2006 | Goto | B22F 5/00 204/164 |
| 2009/0068471 | A1 * | 3/2009 | Choi | B82Y 30/00 428/408 |

FOREIGN PATENT DOCUMENTS

| | | | |
|---|---|---|---|
| JP | 03226986 A | * | 10/1991 |
| JP | 07-135068 A | | 5/1995 |
| JP | 07135068 A | * | 5/1995 |
| JP | 2001-244231 A | | 9/2001 |
| JP | 2001-244321 A | | 9/2001 |
| JP | 2001244321 A | * | 9/2001 |
| JP | 2003-288975 A | | 10/2003 |
| JP | 2009-295960 A | | 12/2009 |
| JP | 2009295960 A | * | 12/2009 |
| TW | 512645 B | | 12/2002 |

OTHER PUBLICATIONS

International Search Report dated Jan. 24, 2012, issued for PCT/JP2011/074458.

Office Action dated Feb. 21, 2014, issued for the corresponding Taiwanese patent application.

* cited by examiner

001# METHOD OF MANUFACTURING CERAMIC SINTERED BODY, CERAMIC SINTERED BODY, AND CERAMIC HEATER

FIELD

The present invention relates to a method of manufacturing a ceramic sintered body, a ceramic sintered body, and a ceramic heater.

BACKGROUND

Conventionally, a ceramic heater formed by burying a heating element in a heater plate made of ceramic is used for heating a wafer in a process of manufacturing a semiconductor, for example, in CVD processing and etching. The ceramic heater is formed by burying metal, serving as the heating element, such as molybdenum having a heat resistance in the ceramic base, molding the ceramic base, and then heating and sintering the molded ceramic base at a high temperature. However, there is a problem that conductivity non-uniformly deteriorates since the buried metal reacts with carbon content in powder and is carbonized during the sintering, and a temperature distribution occurs in the heater plate.

On the other hand, a technique is disclosed in which a metallic heating element buried in a ceramic base is wound by a metal member made of the same material in a non-conduction state, and the ceramic base in which the heating element is buried is sintered to carbonize or oxidize the metal member prior to the heating element, thereby providing a ceramic heater having a high soaking property (for example, see Patent Literature 1).

CITATION LIST

Patent Literature

Patent Literature 1: Japanese Laid-open Patent Publication No. 2009-295960

SUMMARY

Technical Problem

However, the technique disclosed in Patent Literature 1 has a problem in that it requires great time and efforts to wind a heating element with a metal member in a non-conduction state.

The invention is made in view of the above problem, and an object of the invention is to provide a method of manufacturing a ceramic sintered body, a ceramic sintered body, and a ceramic heater which prevent deterioration in conductivity of metal by suppressing and stabilizing carbonization of a metal material buried therein during sintering.

Solution to Problem

To solve the problem described above and achieve the object, a method of manufacturing a ceramic sintered body according to the present invention includes: a film forming step of forming, on a surface of a heat-resistant metal material, a metal coating film made of a metal material having a standard free energy of formation of metal carbides lower than that of the heat-resistant metal material; a molding step of disposing the heat-resistant metal material provided with the coating film in the film forming step at a predetermined position in powder that serves as a starting material of a ceramic base, and molding a ceramic green body by press-molding the powder; and a sintering step of generating a ceramic sintered body by sintering the ceramic green body molded in the molding step.

Moreover, in the method of manufacturing a ceramic sintered body according to the invention described above, the heat-resistant metal material is a metal having a high melting point and low thermal expansion and selected from molybdenum or a molybdenum alloy, tungsten or a tungsten alloy, and niobium or a niobium alloy.

Moreover, in the method of manufacturing a ceramic sintered body according to the invention described above, the metal coating film is formed of titanium, aluminum, tantalum, or zirconium.

Moreover, in the method of manufacturing a ceramic sintered body according to the invention described above, the ceramic base is aluminum nitride, silicon nitride, or aluminum oxide.

Moreover, in the method of manufacturing a ceramic sintered body according to the invention described above, a sintering temperature of the ceramic sintered body is 1,300 to 2,000° C.

Moreover, in the method of manufacturing a ceramic sintered body according to the invention described above, a thickness of the metal coating film is 0.10 to 10.0 μm.

Moreover, a ceramic sintered body according to the present invention is formed by sintering a precursor ceramic that includes: a heat-resistant metal material; a metal coating film which is formed on a surface of the heat-resistant metal material, and is formed of a metal material having a standard free energy of formation of metal carbides lower than that of the heat-resistant metal material; and a ceramic green body obtained by disposing the heat-resistant metal material provided with the metal coating film at a predetermined position in powder that serves as a starting material of a ceramic base, and press-molding the powder, and a metal carbide coating film is formed when the metal coating film is carbonized during the sintering.

Moreover, in the ceramic sintered body according to the invention described above, the heat-resistant metal material is a metal having a high melting point and low thermal expansion and selected from molybdenum or a molybdenum alloy, tungsten or a tungsten alloy, and niobium or a niobium alloy.

Moreover, in the ceramic sintered body according to the invention described above, the metal coating film is formed of titanium, aluminum, tantalum, or zirconium.

Moreover, in the ceramic sintered body according to the invention described above, the ceramic base is aluminum nitride, silicon nitride, or aluminum oxide.

Moreover, in the ceramic sintered body according to the invention described above, a sintering temperature of the ceramic sintered body is 1,300 to 2,000° C.

Moreover, in the ceramic sintered body according to the invention described above, a thickness of the metal coating film is 0.10 to 10.0 μm.

Moreover, a ceramic heater according to the present invention includes one of the above described ceramic sintered body.

Advantageous Effects of Invention

According to the invention, when a metal coating film made of a metal material which has a standard free energy of formation of metal carbides lower than that of a heat-resistant metal material is formed on the heat-resistant metal material, the heat-resistant metal material provided with the metal coating film is buried in a ceramic material and is press-molded, and a molded ceramic green body is sintered, the metal coating film reacts with carbon in ceramic on a priority basis. Thus, there is an effect in that deterioration in conductivity is prevented by suppressing carbonization of the heat-resistant metal material, and non-uniformity of conductivity of the heat-resistant metal material may be suppressed by stabilizing a carbonization reaction thereof even when the heat-resistant metal material is carbonized.

DESCRIPTION OF EMBODIMENTS

Figure 1:
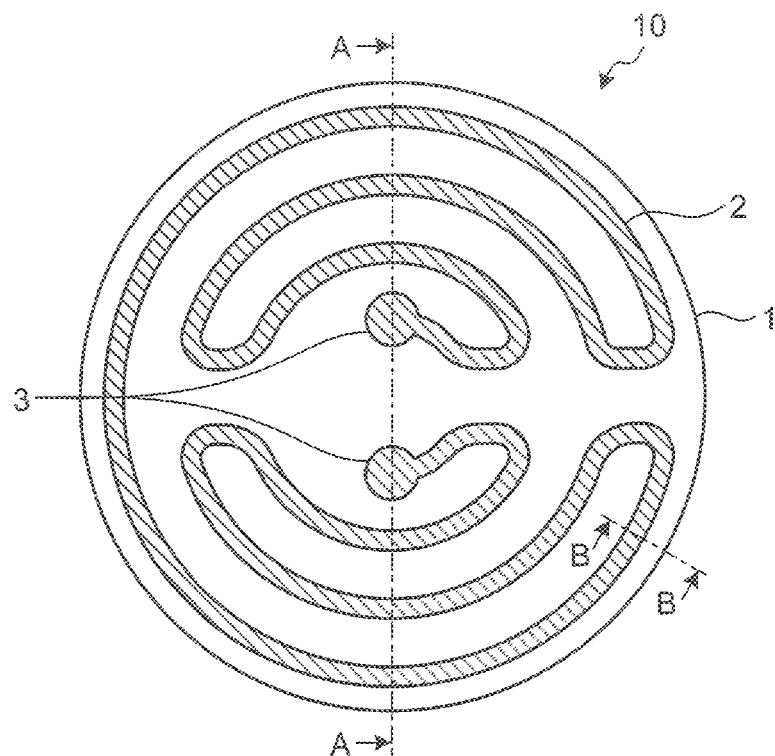
FIG. 1 is a plan view illustrating an example of wiring of a heater line of a ceramic heater according to an embodiment of the invention.

Hereinafter, a method of manufacturing a ceramic sintered body, the ceramic sintered body, and a ceramic heater according to an embodiment of the invention will be described in detail with reference to drawings. In the drawings, the same reference numeral is assigned to the same portion. It should be noted that the drawings are schematic drawings, and a relation between a size and a thickness of a part, or a ratio of a size to a thickness of each part is different from an actual one.

Figure 2:
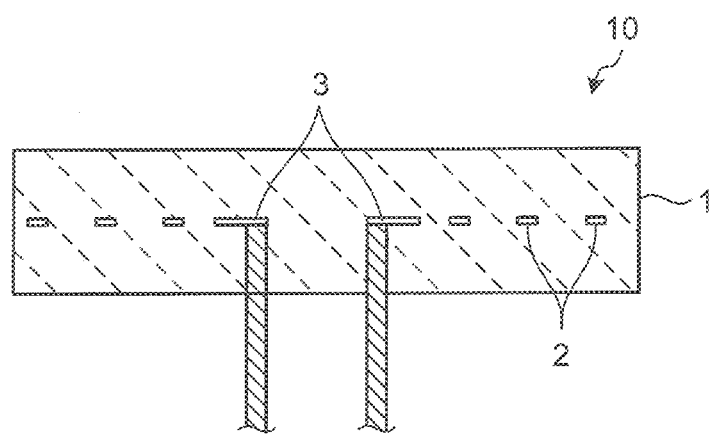
FIG. 2 is a cross-sectional view taken along a line A-A of the ceramic heater of FIG. 1.
Figure 3:
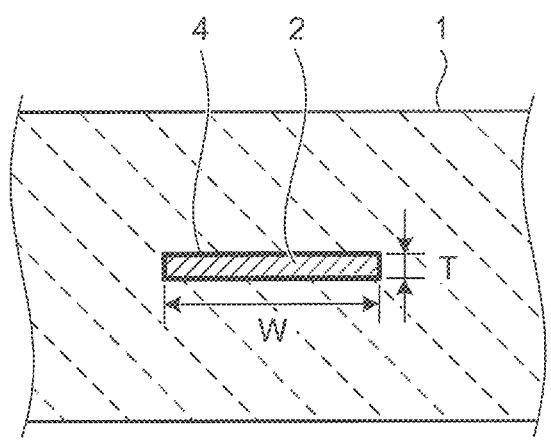
FIG. 3 is a partially enlarged cross-sectional view taken along a line B-B of the ceramic heater of FIG. 1.

A ceramic heater 10 according to the embodiment of the invention includes a disk-shaped heater plate 1, and a heater line 2 in a shape of a foil buried in the heater plate 1. FIG. 1 is a plan view illustrating an example of wiring of a heater line of the ceramic heater 10 according to the embodiment of the invention. FIG. 2 is a cross-sectional view taken along a line A-A of the ceramic heater 10 of FIG. 1. FIG. 3 is a partially enlarged cross-sectional view taken along a line B-B of the ceramic heater 10 of FIG. 1.

The heater plate 1 functions as a carrying plate used for an etching or a film formation of a wafer in a manufacturing process of a semiconductor. The heater plate 1 forms a shape of a disk of about 200 to 500 mm in response to a shape of a work such as the wafer. It is preferable to use aluminum nitride (AlN), silicon nitride ($SiN_x$), aluminum oxide ($Al_2O_3$), and the like as a material of the heater plate 1. The heater plate 1 is sintered at a temperature corresponding to a used material and a sintering additive. For example, aluminum nitride (AlN) is sintered at 1,600 to 2,000° C., silicon nitride ($SiN_x$) is sintered at 1,600 to 2,000° C., and aluminum oxide ($Al_2O_3$) is sintered at 1,300 to 1,600 ° C., respectively.

As illustrated in FIG. 1, the heater line 2 is spirally wired and buried within the heater plate 1. It is preferable to use a heat-resistant metal material, for example, metal having a high melting point and low thermal expansion selected from molybdenum or a molybdenum alloy, tungsten or a tungsten alloy, and niobium or a niobium alloy for the heater line 2. The heater line 2 forms a shape of a foil having a thickness (T) of 25 to 200 μm, and a width (W) of 1 to 10 mm. However, a linear or coiled heater line having a cross-section in a shape of a rectangle or a circle may be used in addition to the shape of a foil.

As illustrated in FIG. 3, a metal carbide coating film 4 is formed on the heater line 2. The metal carbide coating film 4 is formed when a metal coating film 4a (see FIG. 4) formed on the heater line 2 is carbonized by sintering of the heater plate 1. A material (Ma) of the metal coating film 4a is selected from materials having a standard free energy of formation ($\Delta G^0_{MaC}$) of metal carbides (MaC) lower than a standard free energy of formation ($\Delta G^0_{MbC}$) of carbides (MbC) of a metal material (Mb) of the heater line 2.

A standard free energy of reaction in a predetermined temperature range is used as a standard free energy of formation of metal carbides which serves as a criterion of selecting a material of the metal coating film 4a. In the embodiment, a standard free energy of reaction of metal carbides near a sintering temperature of the heater plate 1 is determined to be the criterion. When the metal coating film 4a selected from materials having a standard free energy of reaction of metal carbides near a sintering temperature lower than a standard free energy of reaction of metal carbides of a metal material of the heater line 2 is formed on the heater line 2, the metal coating film 4a reacts with carbon contained in the heater plate 1 at an order of several ppm prior to a material of the heater line 2 during sintering to form the metal carbide coating film 4. When the metal coating film 4a is formed on the heater line 2, it is possible to suppress carbonization of metal which is a material of the heater line 2. Furthermore, even when a metal material of the heater line 2 is carbonized by carbon incompletely trapped by the metal coating film 4a, a carbide layer of the metal material is substantially uniformly formed between the heater line 2 and the metal carbide coating film 4, and thus it is possible to prevent an occurrence of a temperature distribution of the ceramic heater 10 by suppressing non-uniformity of conductivity of the heater line 2 wired within the heater plate 1.

Titanium, aluminum, tantalum, or zirconium is suitable for the metal coating film 4a. However, calcium, chrome, vanadium, and the like may be used depending on a sintering temperature or metal species of the heater line. When molybdenum or a molybdenum alloy is used as the heater line 2, titanium is suitably used as the metal coating film 4a. It is preferable that a thickness of the metal coating film 4a be set to 0.10 to 10.0 μm. The reason is that carbonization of the heater line 2 may not be effectively suppressed when it is too thin, and an influence due to a thermal expansion difference during heating increases when it is too thick.

An electrode terminal 3 is connected to both ends of the heater line 2. The electrode terminal 3 is fixed to the heater plate 1 by brazing and the like. When an electric current is applied to the heater line 2 by applying a voltage to the electrode terminal 3, the heater line 2 generates heat, and the work placed on the heater plate 1 is heated.

Next, a method of manufacturing the ceramic heater 10 according to the embodiment will be described.

FIGS. 4 to 7 are cross-sectional views illustrating a process of manufacturing the ceramic heater 10 according to the embodiment of the invention.

Figure 4:
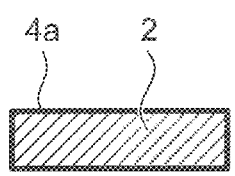
FIG. 4 is a cross-sectional view illustrating a process of manufacturing the ceramic heater according to the embodiment of the invention.

First, the metal coating film 4a is formed on the heater line 2 (see FIG. 4). The metal coating film 4a is formed on the heater line 2 by a vapor deposition, a sputtering, or the like. The metal coating film 4a may be formed on the heater line 2 by covering a top and a bottom of the heater line 2 with two metal foils made of a material of the metal coating film 4a, and performing a rolling and bonding thereon. The metal coating film 4a may be formed on the heater line 2 using a scheme such as a thermal spraying.

First, in the heater plate 1, a lower green body 1a is press-molded. The lower green body 1a is formed by filling a metal mold with a predetermined amount of ceramic powder corresponding to a base material of the heater plate 1, and press-molding the ceramic powder.

Figure 5:
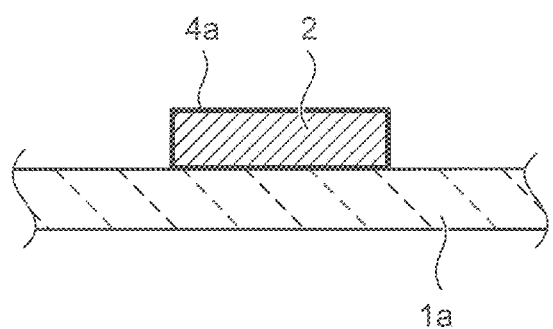
FIG. 5 is a cross-sectional view illustrating a process of manufacturing the ceramic heater according to the embodiment of the invention.

Next, as illustrated in FIG. 5, the heater line 2 provided with the metal coating film 4a is wired at a predetermined position on the molded lower green body 1a.

Figure 6:
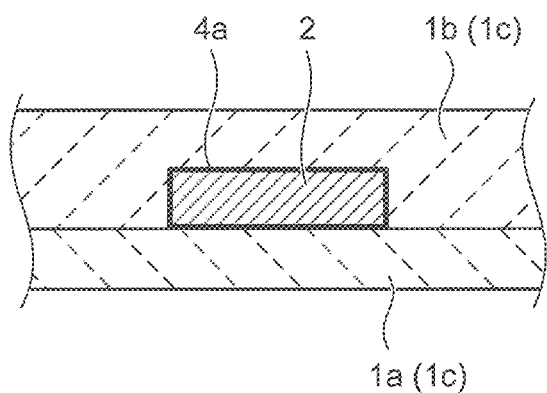
FIG. 6 is a cross-sectional view illustrating a process of manufacturing the ceramic heater according to the embodiment of the invention.

As illustrated in FIG. 6, after wiring the heater line 2, a predetermined amount of ceramic powder is further provided on the lower green body 1a where the heater line 2 is wired, and an upper green body 1b is molded by press-molding the ceramic powder using a metal mold, thereby forming a ceramic green body 1c.

Figure 7:
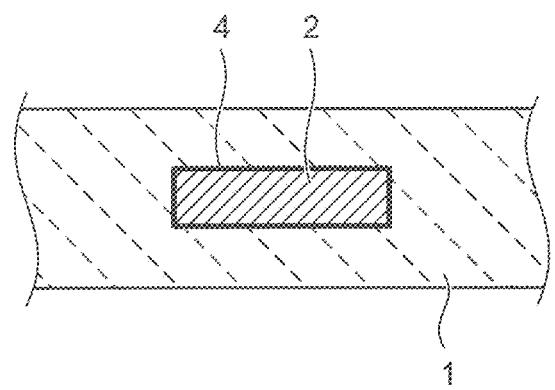
FIG. 7 is a cross-sectional view illustrating a process of manufacturing the ceramic heater according to the embodiment of the invention.

Subsequently, as illustrated in FIG. 7, the ceramic green body 1c is sintered. When aluminum nitride is used as a ceramic base material, a heating compression is performed for several hours at 1,600 to 2,000° C., and 10 to 40 MPa in a nitrogen atmosphere.

When the heater plate 1 corresponding to a ceramic sintered body is formed by sintering the ceramic green body 1c, the metal coating film 4a formed on the heater line 2 reacts with carbon content in the ceramic green body 1c prior to a metal material of the heater line 2, thereby forming the metal carbide coating film 4. In this way, it is possible to prevent deterioration in conductivity of the heater line 2. Further, even when a metal material of the heater line 2 is carbonized by forming the metal carbide coating film 4, it is possible to suppress non-uniformity of conductivity of the heater line 2 wired within the heater plate by stabilizing carbonization of the metal material.

After the sintering, the electrode terminal 3 used for supplying power from the outside is formed by cutting the heater plate 1.

Hereinbefore, the ceramic heater is described in the embodiment. However, the method of manufacturing the ceramic sintered body, and the ceramic sintered body of the invention may be used for a ceramic product in which conductive metal is buried, for example, a stage having an electrostatic chuck function, a ceramic stage incorporating a radio frequency electrode such as plasma etching equipment and plasma CVD equipment, and the like.

EXAMPLE

A test was conducted to verify a performance of the ceramic heater 10 according to the embodiment as follows. Aluminum nitride is used as a material of the heater plate 1. The heater line 2 having a size of 2 mm×6,700 mm×75 μm is formed from a metal foil of pure molybdenum, and the metal coating film 4a that uses titanium having a thickness of 1 μm as a material is formed on the heater line 2 by a sputtering. The heater line 2 provided with the metal coating film 4a is wired at a predetermined position within the heater plate 1, and a press-molding and a sintering (sintering temperature of 1,800° C., pressure of 20 MPa, 6 hours) are performed, thereby manufacturing the ceramic heater 10.

Figure 8:
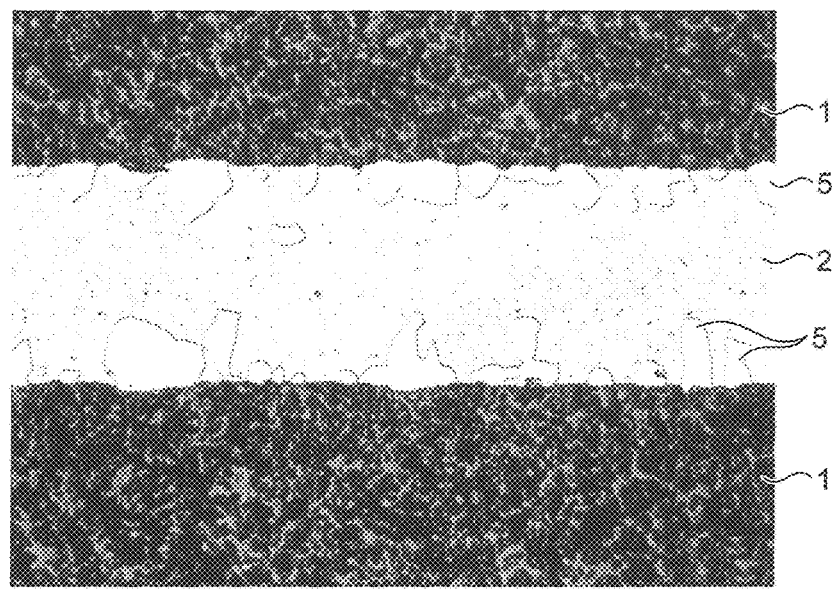
FIG. 8 is a photograph illustrating a portion of a cross-section of a ceramic heater according to a prior art.
Figure 9:
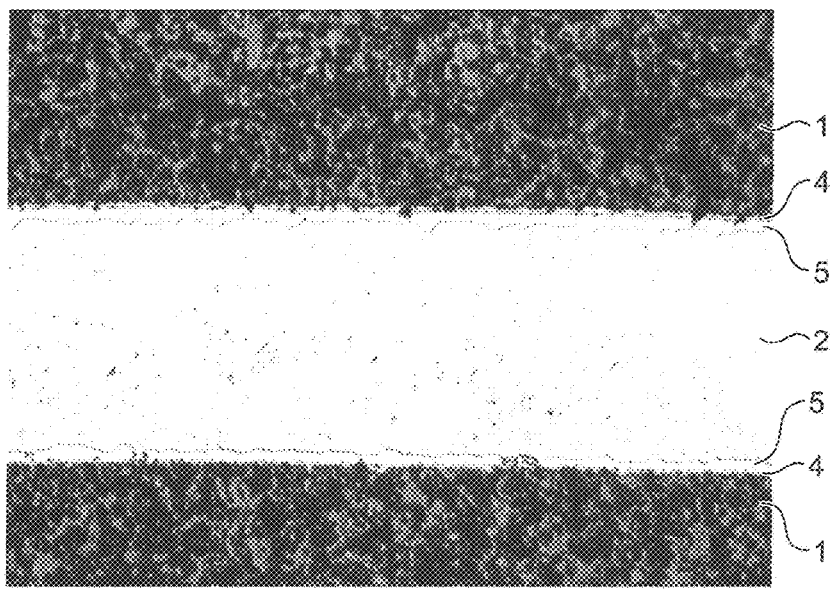
FIG. 9 is a photograph illustrating a portion of a cross-section of a ceramic heater according to Example 1.

FIG. 8 is a photograph illustrating a portion of a cross-section of a ceramic heater according to Conventional Example 1. FIG. 9 is a photograph illustrating a portion of a cross-section of the ceramic heater 10 according to Example 1. Conventional Example 1 is manufactured by using aluminum nitride as a material of the heater plate 1, forming the heater line 2 having a size of 2 mm×6,700 mm×75 μm from a metal foil of pure molybdenum, wiring the heater line 2 at a predetermined position within the heater plate 1, and performing a press-molding and a sintering (sintering temperature of 1,800° C., pressure of 20 MPa, 6 hours), and is different from Example 1 in that the metal coating film 4a of titanium is not formed on the heater line 2 of molybdenum.

As illustrated in FIG. 8, molybdenum carbide 5 is non-uniformly formed within the heater line 2 in the Conventional Example 1 in which the metal coating film 4a is not formed on the heater line 2. On the other hand, as illustrated in FIG. 9, it is verified that the molybdenum carbide 5 is substantially uniformly formed between the heater line 2 and the metal carbide coating film 4 (titanium carbide) in the ceramic heater 10 according to Example 1, and a ratio at which the molybdenum carbide 5 is generated is small when compared to Conventional Example 1.

In addition, electrical resistance values of the heater line 2 of Example 1 and Conventional Example 1 are illustrated in Table 1. Reference Example 1 of Table 1 is an electrical resistance value of the heater line 2 measured before sintering the ceramic heater of Example 1. As illustrated in Table 1, it is verified that while an electrical resistance value which is 2.1 Ω before the sintering increases up to 4.0 Ω (90% increase) after the sintering in Conventional Example 1, the increase is drastically suppressed at 2.9 Ω (38% increase) after the sintering in Example 1.

TABLE 1

|  | Resistance value (Ω) of heater line |
| --- | --- |
| Example 1 | 2.9 |
| Conventional Example 1 | 4.0 |
| Reference Example 1 | 2.1 |

As described in Example 1, it is possible to drastically suppress an increase in electrical resistance value of the ceramic heater 10 sintered by forming the metal coating film 4a by titanium having a standard free energy of formation of metal carbides near a sintering temperature (1,800° C.) of the ceramic heater lower than that of molybdenum carbide on the heater line 2 made of molybdenum.

INDUSTRIAL APPLICABILITY

As described in the foregoing, the method of manufacturing the ceramic sintered body, the ceramic sintered body, and the ceramic heater of the invention may be used for semiconductor manufacturing equipment, and in particular, are suitable for manufacturing a high-quality wafer.

REFERENCE SIGNS LIST

1 HEATER PLATE
2 HEATER LINE
3 ELECTRODE TERMINAL
4a METAL COATING FILM

4 METAL CARBIDE COATING FILM
5 MOLYBDENUM CARBIDE
10 CERAMIC HEATER

The invention claimed is:

1. A method of manufacturing a ceramic sintered body, comprising:
 a film forming step of forming, on a surface of a heat-resistant metal material which is molybdenum or a molybdenum alloy, a metal coating film made of titanium, tantalum, or zirconium which is a metal material having a standard free energy of formation of metal carbides lower than that of the heat-resistant metal material;
 a molding step of disposing the heat-resistant metal material provided with the coating film in the film forming step at a predetermined position in powder that serves as a starting material of a ceramic base, and molding a ceramic green body by press-molding the powder; and
 a sintering step of generating a ceramic sintered body by sintering the ceramic green body molded in the molding step;
 wherein the metal coating film suppresses a carbonization reaction of the heat-resistant metal material during the sintering.

2. The method of manufacturing a ceramic sintered body according to claim 1,
 wherein the ceramic base is aluminum nitride, silicon nitride, or aluminum oxide.

3. The method of manufacturing a ceramic sintered body according to claim 1,
 wherein a sintering temperature of the ceramic sintered body is 1,300 to 2,000° C.

4. The method of manufacturing a ceramic sintered body according to claim 1,
 wherein a thickness of the metal coating film is 0.10 to 10.0 μm.

5. A ceramic sintered body formed by sintering a precursor ceramic, the precursor ceramic comprising:
 a heat-resistant metal material which is molybdenum or a molybdenum alloy;
 a metal coating film which is formed on a surface of the heat-resistant metal material, and is formed of titanium, tantalum, or zirconium which is a metal material having a standard free energy of formation of metal carbides lower than that of the heat-resistant metal material; and
 a ceramic green body obtained by disposing the heat-resistant metal material provided with the metal coating film at a predetermined position in powder that serves as a starting material of a ceramic base, and press-molding the powder,
 wherein a metal carbide coating film is formed when the metal coating film is carbonized during the sintering.

6. The ceramic sintered body according to claim 5,
 wherein the ceramic base is aluminum nitride, silicon nitride, or aluminum oxide.

7. The ceramic sintered body according to claim 5,
 wherein a sintering temperature of the ceramic sintered body is 1,300 to 2,000° C.

8. The ceramic sintered body according to claim 5,
 wherein a thickness of the metal coating film is 0.10 to 10.0 μm.

9. A ceramic heater comprising a ceramic sintered body formed by sintering a precursor ceramic, the precursor ceramic comprising:
 a heat-resistant metal material which is molybdenum or a molybdenum alloy;
 a metal coating film which is formed on a surface of the heat-resistant metal material, and is formed of titanium, tantalum, or zirconium which is a metal material having a standard free energy of formation of metal carbides lower than that of the heat-resistant metal material; and
 a ceramic green body obtained by disposing the heat-resistant metal material provided with the metal coating film at a predetermined position in powder that serves as a starting material of a ceramic base, and press-molding the powder,
 wherein a metal carbide coating film is formed when the metal coating film is carbonized during the sintering.

* * * * *